Figure 1:
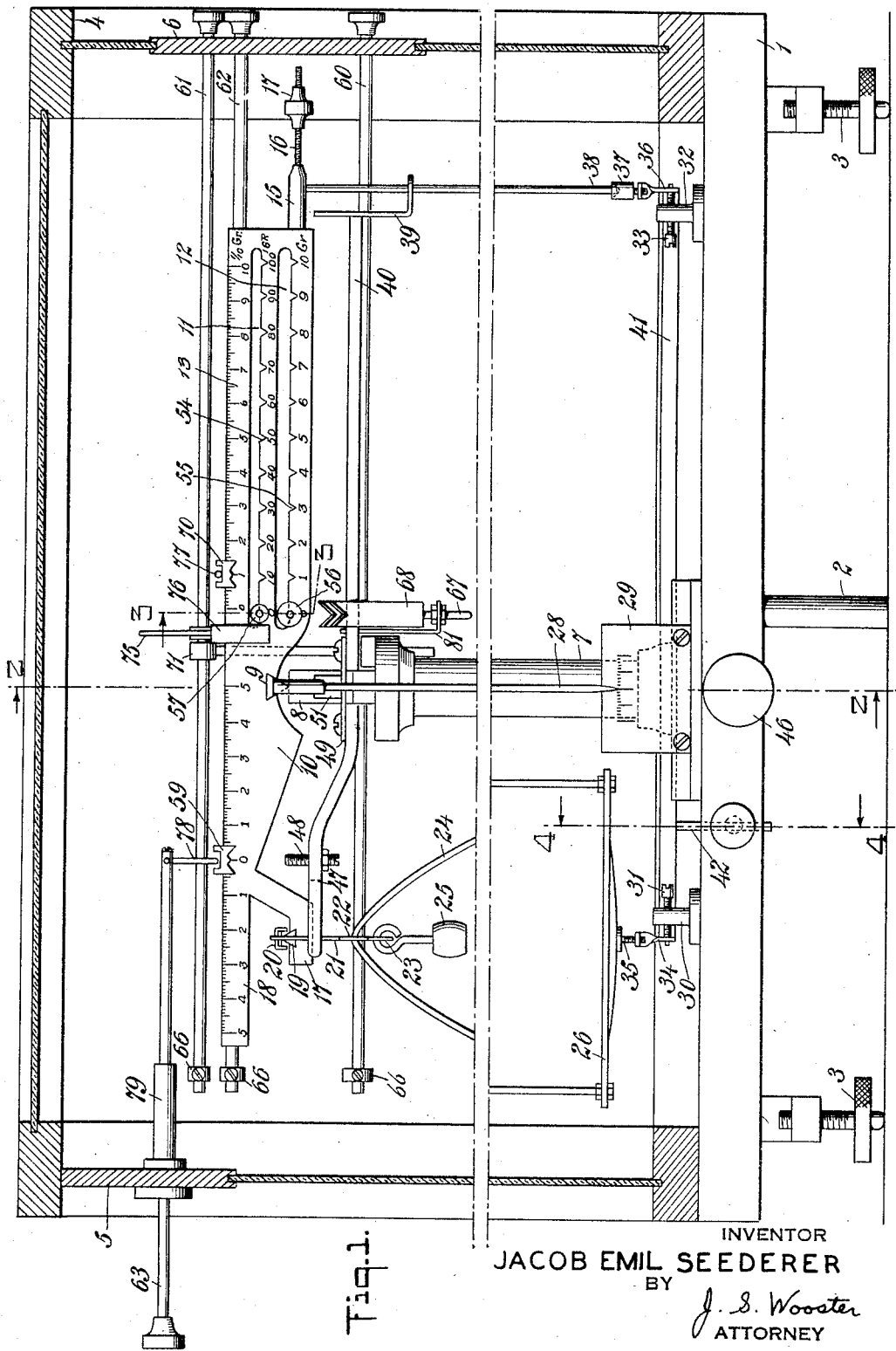

March 7, 1933.  J. E. SEEDERER  1,900,418
BEAM SCALE
Filed May 9, 1929  2 Sheets-Sheet 1

INVENTOR
JACOB EMIL SEEDERER
BY
J. S. Wooster
ATTORNEY

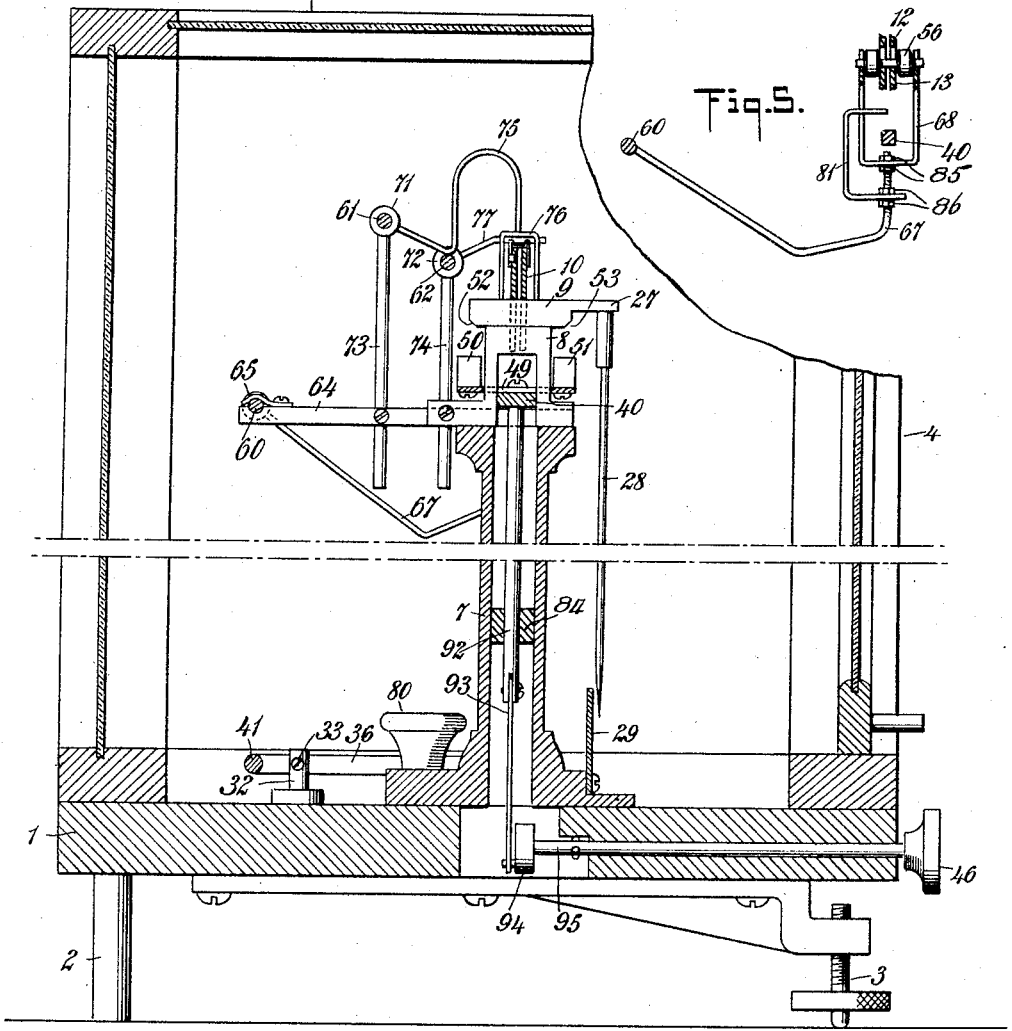

Patented Mar. 7, 1933

1,900,418

UNITED STATES PATENT OFFICE

JACOB EMIL SEEDERER, OF JERSEY CITY, NEW JERSEY, ASSIGNOR TO SEEDERER-KOHLBUSCH, INC., OF JERSEY CITY, NEW JERSEY, A CORPORATION OF NEW JERSEY

BEAM SCALE

Application filed May 9, 1929. Serial No. 361,574.

This invention relates to beam scales and has for an object to provide a more efficient and accurate scale which can be economically manufactured and adjusted and will enable small quantities to be quickly and accurately weighed on an encased scale. A particular object of the invention is to provide an encased scale on which all the weights can be manipulated from outside the case so that the case need never be opened except for placing material to be weighed on the weighing pan and removing same.

A further object of the invention is to provide an arresting device for the weighing beam when not in use which will hold it with far greater security than any device heretofore known in the art and which will automatically align the main knife edge of the beam with the main bearing every time the beam is arrested.

A still further object is to provide a scale in which all the weights are adjusted by increasing or decreasing their distance from the center of the weighing beam thereby eliminating any pan for holding weights and also increasing the ease and speed with which articles are weighed.

This latter object is accomplished by making a plurality of slots in the part of the beam opposite the weighing pan, the lower surfaces of which are notched at equal distances and form tracks for rolling poises usually similar in shape to a spool which can readily be moved from place to place and will hold their position in the notches. As it is practically impossible to cut these notches by machine so that equal masses of the beam lie between them, they are first cut by machine and then filed by hand and therefore, it is a great saving in manufacturing these beam scales to eliminate a large number of notches which I do by using a plurality of slots each of which has notches representing different fractions of weight.

In the accompanying drawings, Fig. 1 is an elevation of a scale embodying the preferred form of my invention, with the case shown in section, and, Fig. 2 is a section on the line 2—2 in the direction indicated by the arrows, and Fig. 3 is a section on the line 3—3 in the direction indicated by the arrow, and Fig. 4 is a section on the line 4—4 in the direction indicated by the arrows.

Fig. 5 is a detail view of the means for shifting the lowest rolling poise on my scale, Figs. 6 and 7 show modifications of the rolling poise.

In the drawings, the scale shown comprises base 1 having a rear leg 2, and levelling screws 3. The case 4, mounted on base 1, is of conventional design, having glass windows, vertical sliding front and wooden panels 5 and 6, through which pass the various adjusting rods. Pedestal 7 supported by base 1 has mounted on the flat top thereof knife edge bearing 8 on which knife edge 9 of the weighing beam 10 rests. This bearing is the main bearing for the scale. The beam 10 is preferably a channel beam or as shown in the drawings, is comprised of two parallel strips fastened together, although it may be the conventional one piece solid beam. As shown in Fig. 1, the beam 10 to the right of the main bearing 8 has two longitudinal slots 11 and 12. To the right hand end of beam 10 is fastened extension shaft 15 which carries threaded shaft 16 on which balance weight 17 is mounted. To the left of the main bearing, the beam is formed into an upper arm 18 and lower arm 17 on the latter of which is disposed knife edge 19. This knife edge 19 is adapted to engage the bearing member 20 mounted in yoke member 21, the lower portion of which is provided with upwardly and outwardly extending arms 22 and 23 which engage yoke 24, supporting weighing pan 26, and balance weight 25, respectively.

The knife edge 9 is provided with projection 27 which extends beyond the base of the pedestal 7 and to which is fastened the vertical pointer 28. This pointer is adapted to swing over indicator plate 29 mounted on the base of pedestal 7. The indicator plate 29 has marked on it the neutral point and equal graduations to the right and left thereof to determine the balance by the swinging of the pointer.

To keep the weighing pan 26 at rest and also to prevent the beam 10 from oscillating while the object to be weighed is being placed on the pan 26 and the weights are being adjusted, supports 30 and 32 having pivot screws 31 and 33 respectively, mounted therein, are screwed to base 1. Pivoted on the screw 31 is strip 34 having threaded stop 35 mounted in one end thereof, said stop 35 being positioned under the center of the pan 26. Pivoted on the screw 33 is strip 36 in one end of which is mounted cup 37 having a threaded portion adapted to engage a correspondingly threaded opening in strip 36. One end of the rod 38 rests by gravity in cup 37 and the other end engages the extension shaft 15 of the weighing beam 10; bracket 39, mounted on the end of the beam arrest 40, is provided with an opening through which rod 38 passes. Connecting the other ends of pivoted strips 34 and 36 is the comparatively heavy horizontal bar 41. This bar 41 must have sufficient mass to overbalance that part of strips 34 and 36, and the parts supported thereby, on the opposite side of the pivot screws 31 and 33, respectively. In the normal position of the scale, the bar 41 will swing the forward parts of strips 34 and 36 upward so that stop 35 will engage the pan 26, thus preventing it from moving, and cup 37 will push rod 38 up until it engages extension shaft 15 thus preventing oscillation of the weighing beam 10. In order to release the beam 10 for weighing purposes, the bar 41 is provided with perpendicular rod 42 passing through base 1. Rod 43 is mounted in the base 1, running from front to back, and is so positioned that it may engage rod 42. This rod 43 projects beyond the base at the front of the scale and has mounted on its end the knob 44. Spring 45 mounted on the rod 43 inside the base 1 is adapted to yieldingly hold rod 43 out of engagement with rod 42. The operator, by pushing knob 44 in, forces rod 42 to the right, as shown in Fig. 4, which forces horizontal bar 41 up and consequently disengages all the moving parts of the beam 10 enabling it to oscillate freely. To lock rod 43 in this position stud 82 is mounted on the rod so that it will register with recess 83 in the base when the rod is pushed in. By turning knob 44 ninety degrees stud 82 will be inserted in the recess thus locking the rod.

To protect the knife edges 9 and 19 from damage due to jarring of the scale when not in use and also to be sure that the various parts of the scale will be properly aligned when in use, the weighing beam 10 and yoke 21 are lifted off the bearing 8 and knife edge 19 respectively and firmly held by the beam arrest 40. The beam arrest 40 is mounted on piston 92 disposed in the pedestal 7. Perpendicular motion is given to the piston 92 by means of connecting link 93, crank 94, and shaft 95 extending to the front of the scale. The piston passes through bushing 84 which guides it. The piston is actuated by the operator turning the knob 46 mounted on shaft 95. As shown in Fig. 1, the beam arrest 40 to the left of piston 92 is fork-shaped, being formed into two arms at point 47 between which the lower arm 17 of the left side of beam 10 is positioned. The yoke member 21 is widened out at the top so that it engages the two arms of bar 40 when said bar is elevated. The bar 40 as shown in the drawings is at its lowest position and therefore is not shown engaging yoke member 21. Mounted on the bar 40 just to the right of point 47 is screw 48 provided with a lock nut to secure it in such a position that it will engage beam 10 at the same instant the arms of bar 40 engage yoke member 21 upon elevation of bar 40.

Mounted on the right hand end of bar 40 is bracket 39 as previously described. This bracket extends above bar 40 far enough so that it engages extension shaft 15, at the same time the previously described engaging members of shaft 40 engage their respective parts upon elevation of piston 92.

Mounted centrally on the bar 40 with respect to the piston 92, is circular plate 49. This plate 49 has portions cut away so that the sides of main bearing 8 may be passed through without coming into contact with it. Metal blocks 50 and 51 are fastened to the upper surface of plate 49 and are so positioned that they engage beveled edges 52 and 53 respectively of knife edge 9 at the same time bracket 39 engages extension shaft 15 upon elevation of the piston 92. Metal blocks 50 and 51 preferably are each provided with a groove at a forty-five degree angle to the horizontal into which the beveled edges 52 and 53 of knife edge 9 fit so that the knife edge 9 will be firmly held in position directly above bearing 8. An additional advantage of these grooves is that if the weighing beam has been jarred out of proper alignment with bearing 8, it can be quickly and easily aligned by elevating the piston 92 until blocks 50 and 51 engage the beveled edges of knife edge 9. Obviously the knife edge 9 will settle in the grooves of the blocks in proper position with respect to bearing 8 and the piston 92 can then be lowered until the knife edge 9 rests on bearing 8.

From the above description it will be seen that when not in use, the weighing beam 10 and its associate parts are firmly held at six points, namely, at both sides of yoke 21, at a point just to the right of arm 17 of the beam 10, at the front and back of knife edge 9, and at a point on the extension shaft 15, and that it is automatically aligned with bearing 8 every time it is arrested because of the grooved blocks 50 and 51 and the beveled edges 52 and 53 of knife edge 9.

Slots 12 and 11 of weighing beam 10 have equally spaced notches 55 and 54 respectively, the bottom of the slots forming tracks (see Fig. 3) on which the movable primary poise 56 and secondary poise 57, respectively, both in the form of a spool, can roll, the spindle 58 of each being of such diameter relatively to the size of the notches as to fit therein and hold during vibration of the beam. These spindles are tapered toward their centres and the beam 10 is preferably channeled or formed of two separate strips to give greater security to the position of the poises. As shown in Fig. 1, the notches in slot 12 represent grams and the notches in slot 11 represent 1/10 grams. Clearly these notches can be made to represent other fractions or units of weight by varying the position of the notches and the weight of the poises. In balancing up the beam, the notches 54 and 55 can first be cut by machine and then easily filed where necessary for exact balance throughout.

An additional advantage in having the beam 10 channeled or formed of two parallel strips is that the modified rolling poises shown in Figs. 6 and 7 can be used. The poise shown in Fig. 6 is particularly useful where an extremely light poise is desired because by having only a single enlarged section the enlargement can be greater and will fit in the channel or between the two parallel strips giving greater stability and ease of manipulation. The poise shown in Fig. 7 is especially adapted to be used when the poise must be relatively heavy as the three enlarged sections permit a reduction in size of each enlargement and the center section will travel in the channel of the beam. Obviously this gives a more stable poise that can be manipulated with more security.

The top bar 13 of the beam 10 has graduations thereon representing 1/100 grams as shown with which the tertiary sliding poise 70 cooperates. This poise is very light and slides easily along the top. The left hand side of beam 10 is also provided with graduations with which sliding poise 59 cooperates. Poise 59 functions as a delicate counter poise, or can also be used for adding or subtracting weights.

In order to shift the various poises without opening the balance case, adjusting rods 60, 61, 62 and 63 are provided for moving poises 56, 57, 70 and 59 respectively. These rods pass through wooden panels 5 or 6 in the side of the case and are provided with knobs on their outer ends by which the operator manipulates them. Adjusting rod 60 passes through panel 6 and also through the clamping member 65 mounted on the rear end of support beam 64 which extends rearwardly from the base of bearing 8. Intermediate collar 65 and panel 6, the rod 60 has mounted thereon the bent arm 67 on the threaded outer end of which is mounted the upright bifurcated bracket 68 by means of a pair of lock nuts 85 (see Fig. 5). The top edges of the two arms of bracket 68 are notched and the distance separating the two arms is adjusted so that they will engage the portions of the spindle 58 extending beyond the enlarged sections of the poise 56. By turning the rod 60 the bracket 68 will lift the poise 56 out of the particular notch it is in and then by moving the rod 60 to the right or the left the poise may be moved to a new position where it may be deposited by turning the rod 60 in the opposite direction. In order to limit the distance which the arm 67 may be rocked and thereby prevent the operator from accidentally displacing other parts of the scale, the bracket 68 (see Fig. 5) is carefully positioned on the threaded end of arm 67 so that the end of arm 67 will contact with the beam arrest 40 when bracket 68 is just high enough to lift the poise 56 clear of its track. To limit the movement of arm 67 in the opposite direction bent rod 81, having a hole in one end through which the threaded end of arm 67 passes, is positioned on said threaded end by means of a pair of lock nuts 86 so that the opposite end of said rod 81 will hook over beam arrest 40 when the bracket 68 has been lowered sufficiently to clear beam 10 and thereby prevent further movement downward. It is shown in this lower position in Fig. 1.

Adjusting rods 61 and 62 are similarly mounted by being passed through panel 6 and collars 71 and 72 respectively, which are mounted on vertical rods 73 and 74. Rods 73 and 74 are supported by support beam 64. Mounted on rod 61 intermediate collar 71 and panel 6 is bent arm 75 carrying the inverted U-shaped bracket 76 which is adapted to engage the spindle projecting on both sides of rolling poise 57, and thereby providing means for the manipulation of this poise by rod 61. The bracket 76 is prevented from rocking further down than its position shown in Figs. 1 and 2, by the arm 75 engaging adjusting rod 62. (See Fig. 2.) The bracket 76 at this limiting position is still high enough to pass over the sliding poise 70 without disturbing it. Similarly mounted on adjusting rod 62 is the bent rod 77 which is adapted to engage the light sliding poise 70 and move it. It will be obvious that by simply turning rods 61 and 62 the poises 57 and 70 can be entirely disengaged from the manipulating devices and the beam freed for weighing.

On the left hand ends of rods 60, 61 and 62, as shown in Fig. 1, are mounted adjustable stops 66 to prevent the rods from being drawn entirely through the clamp member 65, collars 71 and 72, respectively, and thereby get out of alignment.

Adjusting rod 63 is passed through collar 79 mounted in panel 5 which is the sole means of holding and guiding this rod. Mounted on the end of this adjusting rod is arm 78 adapted to engage and move counter poise 59.

Because of the various manipulating rods described above it will be seen that I have devised a beam scale suitable for the most delicate work all of the weights of which may be manipulated from outside its case.

Mounted on the base of the pedestal 7 is a spirit level 80 to determine when the levelling screws 3 are properly adjusted to maintain the scale perfectly level.

The invention claimed is:

1. A beam scale comprising a case, a beam pivoted therein having a longitudinal slot and notches in said slot, a rolling poise in said slot cooperating with the notches therein, and means for manipulating said rolling poise exteriorly of said case.

2. A beam scale comprising a case, a beam pivoted therein having a longitudinal slot and notches in said slot, a movable poise in said slot cooperating with the notches therein, the upper edge of the beam having graduations correlated with said notches, a second movable poise seated on the upper edge of the beam, and means for manipulating said poises exteriorly of said case.

3. A beam scale comprising a case, a beam pivoted therein having a plurality of longitudinal slots and notches in each of said slots correlated with the notches in the other slots, a movable poise in each of said slots cooperating with the notches therein, and means for manipulating said poises exteriorly of said case.

4. A beam scale comprising a case, a beam pivoted therein, having a plurality of longitudinal slots and notches in each of said slots correlated with the notches in the other slots, a rolling poise in each of said slots cooperating with the notches therein, and means for manipulating said rolling poises exteriorly of said case.

5. A beam scale comprising a case, a beam pivoted therein having a plurality of longitudinal slots and notches in each of said slots correlated with the notches in the other slots, a rolling poise in each of said slots cooperating with the notches therein, the upper edge of the beam having graduations correlated with said notches, a sliding poise seated on the upper edge of the beam, and means for manipulating said rolling poises and said sliding poise exteriorly of said case.

6. A beam scale comprising a pivoted beam having a plurality of longitudinal slots and notches in each of said slots correlated with the notches in the other slots, a rolling poise in each of said slots cooperating with the notches therein, and individual means for manipulating said rolling poises independently of each other.

7. A beam scale comprising a pivoted beam, a weighing pan dependent from said beam on one side of its pivot, means for preventing oscillation of said beam and pan comprising normally upwardly pressing means engaging the pan and the beam on the opposite side of its pivot from said weighing pan, and means for relieving the pressure of said upwardly pressing means.

8. A beam scale comprising a pivoted weighing beam, a weighing pan dependent from said beam on one side of the pivot, means for preventing oscillation of said beam and pan comprising normally upwardly pressing means engaging the pan and the beam on the opposite side of its pivot from the pan, means for relieving the pressure of said upwardly pressing means, and means for locking said pressure relieving means.

9. A beam scale comprising a pedestal, a beam pivoted thereon, supporting means for a weighing pan dependent from said beam, means for arresting said beam and supporting means comprising a vertically movable bar adapted to engage simultaneously the supporting means and the beam at its pivot and at two points on opposite sides of its pivot upon being elevated and means for moving said bar vertically.

10. A beam scale comprising a case, a pivoted beam having a longitudinal slot and notches in the slot, a rolling poise in said slot cooperating with said notches, and means for moving said rolling poise in the slot comprising a slidable rod adapted to be rotated about its longitudinal axis, a bracket carried thereby adapted to engage the poise, and means for limiting the position of the engaging end of the bracket with respect to the beam.

11. A beam scale comprising a case, a pivoted beam having an upper and lower longitudinal slot and notches in each slot correlated with the notches in the other slot, a rolling poise in each slot cooperating with the notches therein, means for moving the poise in the upper slot comprising a slidable rod parallel to the beam and adapted to be rotated about its longitudinal axis and an inverted U-shaped bracket carried thereby adapted to engage said poise, and means for moving the poise in the lower slot comprising a slidable rod parallel to the beam and adapted to be rotated about its longitudinal axis and an upright U-shaped bracket carried thereby adapted to engage said poise.

12. A scale beam having a plurality of longitudinal slots and notches in each of said slots correlated with the notches in the other slots and a rolling poise in each of said slots cooperating with the notches therein.

13. A scale beam having a plurality of longitudinal slots and notches in each of said slots correlated with the notches in the other slots, a rolling poise in each of said slots cooperating with the notches therein, the upper edge of the beam having graduations correlated with said notches.

14. A rolling poise for a beam scale comprising a spindle having a plurality of enlarged cylindrical sections, said spindle projecting beyond the two end sections and being tapered intermediate adjacent sections toward the midpoint between said sections.

15. A rolling poise for a beam scale comprising a spindle having a pair of enlarged cylindrical sections intermediate its ends and spaced equally from its center, the spindle between said sections being tapered toward its center.

Signed at Jersey City, in the county of Hudson, and State of New Jersey, this third day of May, A. D. 1929.

JACOB EMIL SEEDERER.